(12) United States Patent
Axnäs et al.

(10) Patent No.: US 12,225,594 B2
(45) Date of Patent: *Feb. 11, 2025

(54) CONFIGURING RANDOM ACCESS CHANNELS FOR WIRELESS COMMUNICATIONS

(71) Applicant: TELEFONAKTIEBOLAGET LM ERICSSON (PUBL), Stockholm (SE)

(72) Inventors: Johan Axnäs, Solna (SE); Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/726,213

(22) Filed: Apr. 21, 2022

(65) Prior Publication Data

US 2022/0248459 A1  Aug. 4, 2022

Related U.S. Application Data

(63) Continuation of application No. 16/535,705, filed on Aug. 8, 2019, now Pat. No. 11,343,858, which is a
(Continued)

(51) Int. Cl.
*H04W 74/0833* (2024.01)
*H04W 72/0446* (2023.01)
(Continued)

(52) U.S. Cl.
CPC ..... *H04W 74/085* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

| 2013/0201885 A1 | 8/2013 | Yang et al. |
| 2015/0333879 A1 | 11/2015 | Yang et al. |

(Continued)

FOREIGN PATENT DOCUMENTS

| EP | 3123802 B1 | 10/2018 |
| EP | 3530062 B1 | 6/2020 |

(Continued)

OTHER PUBLICATIONS

CMCC, "Discussion on RACH configuration", 3GPP TSG RAN WG1 Meeting Ad-hoc#3, R1-1716046, Nagoya, Japan, Sep. 18-21, 2017.
(Continued)

*Primary Examiner* — Christine T Duong

(57) ABSTRACT

According to some embodiments, a method for use in a wireless communication network includes a wireless device receiving, from a network, a configuration corresponding to a Physical Random Access Channel (PRACH). The wireless device receives, from the network via Radio Resource Control (RRC) signaling, a bitmap that provides an indication of time locations corresponding to synchronization signal (SS) blocks. The wireless device determines, based on the configuration and the bitmap, a time slot that does not overlap with the time locations to perform a PRACH transmission during the determined time slot.

17 Claims, 12 Drawing Sheets

Related U.S. Application Data continuation of application No. 16/196,341, filed on Nov. 20, 2018, now Pat. No. 10,425,974, which is a continuation of application No. PCT/IB2018/056747, filed on Sep. 4, 2018.

(60) Provisional application No. 62/567,168, filed on Oct. 2, 2017.

(51) Int. Cl.
*H04W 72/0453* (2023.01)
*H04W 74/00* (2009.01)
*H04W 56/00* (2009.01)

(52) U.S. Cl.
CPC ..... *H04W 74/004* (2013.01); *H04W 74/0833* (2013.01); *H04W 56/00* (2013.01)

(56) References Cited

U.S. PATENT DOCUMENTS

| | | | |
|---|---|---|---|
| 2016/0227522 A1 | 8/2016 | Dinan | |
| 2017/0251460 A1 | 8/2017 | Agiwal et al. | |
| 2017/0332413 A1 | 11/2017 | Pelletier et al. | |
| 2018/0132282 A1 | 5/2018 | Ly et al. | |
| 2018/0324678 A1 | 11/2018 | Chen et al. | |
| 2018/0324864 A1 | 11/2018 | Jung et al. | |
| 2018/0368189 A1 | 12/2018 | Narasimha et al. | |
| 2019/0081721 A1 | 3/2019 | Ly et al. | |
| 2020/0178306 A1 | 6/2020 | Ohara et al. | |
| 2020/0229236 A1* | 7/2020 | Ohara | H04W 74/0833 |
| 2021/0136823 A1* | 5/2021 | Kim | H04W 74/0891 |

FOREIGN PATENT DOCUMENTS

| | | |
|---|---|---|
| KR | 20160038001 A | 4/2016 |
| KR | 20160136385 A | 11/2016 |
| KR | 20170080597 A | 7/2017 |
| RU | 26124081 C1 | 3/2017 |
| WO | 2013116762 A1 | 8/2013 |
| WO | 2016073104 A1 | 5/2016 |
| WO | 2017155239 A2 | 9/2017 |

OTHER PUBLICATIONS

Ericsson, "NR four-step random access procedure", 3GPP TSG-RAN WG1 NR adhoc, Spokane, USA, Jan. 16-20, 2017, pp. 1-6, R1-1700299, 3GPP.

Ericsson, "NR PRACH design", 3GPP TSG-RAN WG1 Meeting #89, Hangzhou, China, May 15-19, 2017, pp. 1-13, R1-1708725, 3GPP.

Ericsson, "Summary of discussion on SS block composition, SS burst set composition and SS time index Indication", Spokane, USA, Apr. 3-7, 2017, pp. 1-2, R1-1706534, 3GPP.

Interdigital Inc., "On SS Block and Burst Set Design and Indication", 3GPP TSG RAN WG1 Meeting #90, Prague, Czech Republic, Aug. 21-25, 2017, pp. 1-4, R1-1714129, 3GPP.

LG Electronics, "Discussion on RACH Procedure", 3GPP TSG-RAN WG1 Meeting #89, May 15-19, 2017, pp. 1-11, R1-1707594, 3GPP.

Motorola Mobility et al., "Discussion on SS block transmission", 3GPP TSG-RAN WG1#88bis, Spokane, USA, Apr. 3-7, 2017, pp. 1-4, R1-1705549, 3GPP.

Nokia et al., "NR random access procedure", 3GPP TSG-RAN WG1#88bis, Spokane, USA, Apr. 3-7, 2017, pp. 1-10, R1-1704943, 3GPP.

Nokia et al., "Remaining details on PRACH procedure", 3GPP TSG-RAN WG1#NR3, Nagoya, Japan, Sep. 18-21, 2017, pp. 1-12, R1-1716138, 3GPP.

Nokia et al., "Remaining details on SS burst set related procedures", 3GPP TSG-RAN WG1#NR3, Nagoya, Japan, Sep. 18-21, 2017, pp. 1-9, R1-1715908, 3GPP.

Samsung, "4-step RACH procedure discussion", Prague, Czechia, Aug. 22-27, 2017, pp. 1-13, R1-1713562, 3GPP.

CATT, "NR RACH Preamble Format for capacity enhancement", 3GPP TSG RAN WG1 Meeting #90, Prague, Czechia, Aug. 21-25, 2017, pp. 1-29, R1-1712357, 3GPP.

Ericsson, "NR PRACH preamble design", 3GPP TSG-RAN WG1 Meeting #86bis, Lisbon, Portugal, Oct. 10-14, 2016, pp. 1-7, R1-1609671, 3GPP.

ETSI TR 138.912, 5G: Study on new radio access technology (3GPP TR 38.912 version 14.1.0 Release 14), V14.1.0, 78 pages, Oct. 2017.

3GPP, "3rd Generation Partnership Project; Technical Specification Group Radio Access Network; Evolved Universal Terrestrial Radio Access (E-UTRA); Physical channels and modulation (Release 14)", Sep. 2016, pp. 1-170, 3GPP TS 36.211 v14.0.0, Sophia Antipolis, Valbonne, France.

MCC Support, "Final Report of 3GPP TSG RAN WG1 #90 v1.0.0 (Prague, Czech Rep, Aug. 21-25, 2017)", 3GPP TSG RAN WG1 Meeting #90bis, Prague, Czech Rep, Oct. 9-13, 2017, pp. 1-172, R1-1716941, 3GPP.

NTTDocomo, Inc., "Discussion on remaining details on RACH procedure", 3GPP TSG RAN WG1 Meeting NR#3, Nagoya, Japan, Sep. 18-27, 2017, pp. 1-7, R1-1716074, 3GPP.

* cited by examiner

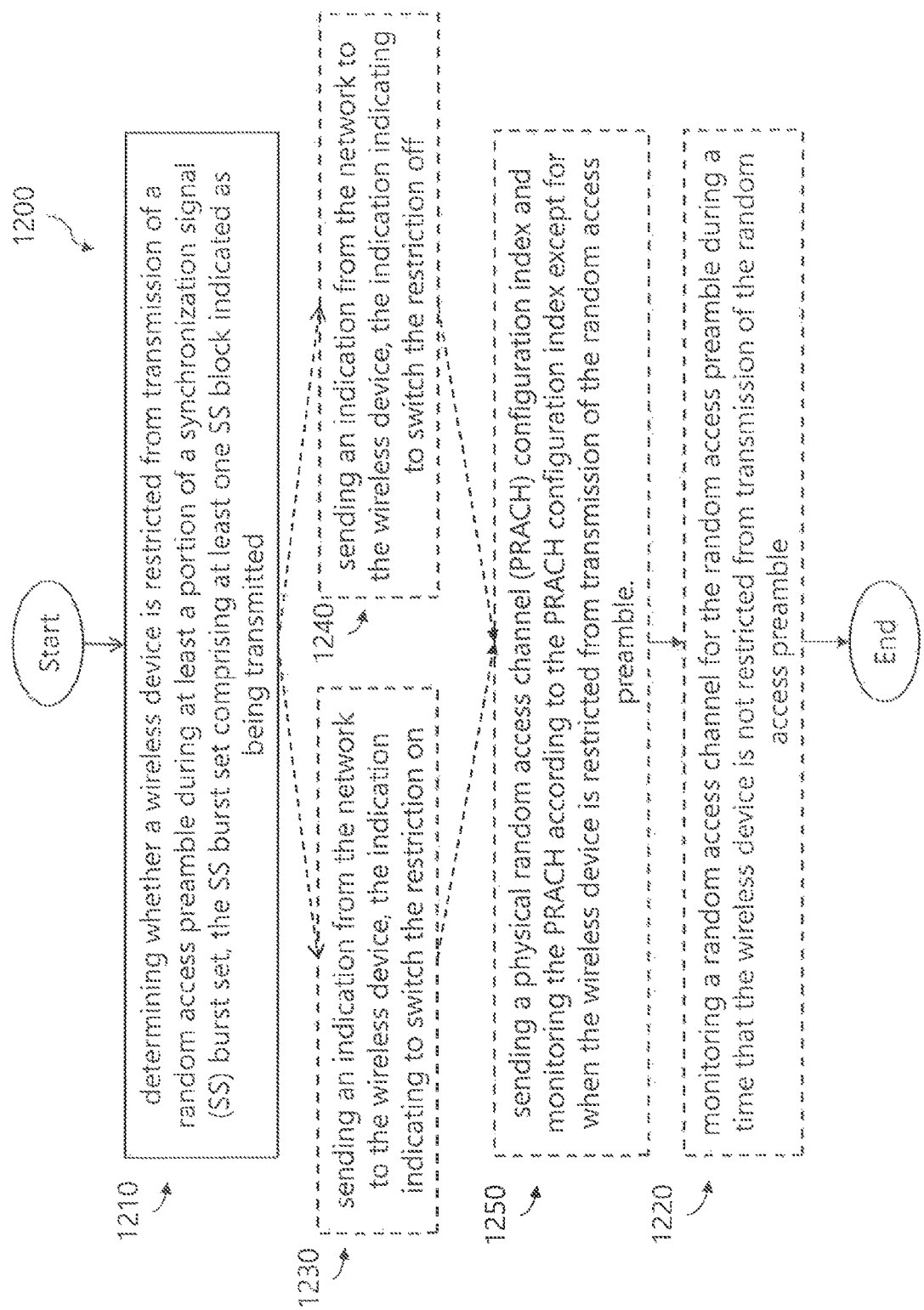

CONFIGURING RANDOM ACCESS CHANNELS FOR WIRELESS COMMUNICATIONS

This application is a continuation of U.S. application Ser. No. 16/535,705, filed Aug. 8, 2019, which is a continuation of U.S. application Ser. No. 16/196,341, filed Nov. 20, 2018, now U.S. Pat. No. 10,425,974, which is a continuation of International Application No. PCT/IB2018/056747, filed Sep. 4, 2018, which claims the benefit of U.S. Provisional Application No. 62/567,168, filed Oct. 2, 2017, the disclosures of which are fully incorporated herein by reference.

TECHNICAL FIELD

The present disclosure relates, in general, to random access procedures used in wireless communications and more specifically to NR-RACH configurations in time.

BACKGROUND

Random Access Procedure

A random access (RA) procedure is a key function in a cellular system. In LTE, a wireless device, e.g., a user equipment (UE), that would like to access the network initiates the random access procedure by transmitting a preamble (e.g., Msg1) in the uplink on the Physical Random Access Channel (PRACH). A Next Generation NodeB (gNB) or TRP (Transmission and Reception Point i.e. a base station, access node) receiving the preamble and detecting the random-access attempt will respond in the downlink by transmitting a random access response (RAR, e.g., Msg2). The RAR carries an uplink scheduling grant for the UE to continue the procedure by transmitting a following subsequent message in the uplink (e.g., Msg3) for terminal identification. A similar procedure is envisioned for new radio (NR). For example, FIG. 1 illustrates an example of an initial access procedure considered for NR.

Before transmission of the PRACH preamble, the UE receives both a set of synchronization signals and configuration parameters on a broadcast channel in an SS-block (e.g., NR-PSS, NR-SSS, NR-PBCH), possibly complemented with configuration parameters received on yet another channel.

A possible PRACH preamble design for NR is described in R1-1609671, "NR PRACH preamble design", 3GPP TSG-RAN WG1 #86bis, Lisbon, Portugal, Sep. 10-14, 2016, as also illustrated by formats 2 to 5 in FIG. 2 (PRACH preamble formats). This PRACH format is based on repeating the same PRACH sequence (or PRACH OFDM symbol) without a cyclic prefix (CP) between the repetitions, such that one PRACH OFDM symbol acts as a cyclic prefix for the next PRACH OFDM symbol.

FIG. 2 illustrates six formats with different lengths of the PRACH preamble such that they can be used for different coverage situations or for different receiver beamforming sweep. The length of each format may be changed depending upon sub-carrier spacing. Here, a slot is used as time unit on the horizontal axis with 14 PUSCH OFDM symbols in each slot.

The mapping from one SS-block to a set of PRACH preambles depends on number of PRACH preambles associated with each SS-block. Here, the maximum number of SS-blocks, L, will depend on the carrier frequency according to agreements in 3GPP RAN1 #88bis where the maximum number of SS-blocks is to be selected between 1 and 64:
Agreements:

The considered maximum number of SS-blocks, L, within SS burst set for different frequency ranges are
  For frequency range up to 3 GHz, the maximum number of SS-blocks, L, within SS burst set is [1, 2, 4]
  For frequency range from 3 GHz to 6 GHz, the maximum number of SS-blocks, L, within SS burst set is [4, 8]
  For frequency range from 6 GHz to 52.6 GHz, the maximum number of SS-blocks, L, within SS burst set is [64]
  The way the value of L is reflected in specification is FFS
  Aforementioned values are to be used to facilitate the NR initial access design and evaluate the specification impact
  Possibility of having unified frequency agnostic signaling design is not precluded
  It is further proposed to be possible to indicate that not every SS block is actually transmitted:
Working Assumptions:
  UE-specific RRC signaling with full bitmap can be used for indicating the actually transmitted SS blocks for both sub 6 GHz and over 6 GHz cases
  The actually transmitted SS blocks is indicated in RMSI for both sub 6 GHz and over 6 GHz cases
  Indication is in compressed form in above 6 GHz case, and an indication method is down-selected from following alternatives
    Alt.1: Group-Bitmap+Bitmap in Group
    A Group is defined as consecutive SS/PBCH blocks
    Bitmap in Group can indicate which SS/PBCH block is actually transmitted within a Group, each Group has the same pattern of SS/PBCH block transmission, and Group-Bitmap can indicate which Group is actually transmitted
    E.g., [8]+[8] bits in case of 8 Groups and 8 SS/PBCH blocks per Group
    Alt.2: Group-Bitmap+The number of actually transmitted SS/PBCH block in Group (with fixed starting index of SS/PBCH block)
    A Group is defined as consecutive SS/PBCH blocks
    Group-Bitmap can indicate which Group is actually transmitted, SS/PBCH blocks within a Group are logically consecutive, the number of actually transmitted SS/PBCH block indicates how many logically consecutive SS/PBCH blocks are actually transmitted starting from the first index, and the number is commonly applied to all transmitted Groups
    E.g., [8]+[3] bits in case of 8 Groups and 8 SS/PBCH blocks per Group
    Alt.3: Bitmap in Group+The number of actually transmitted Groups (with fixed starting index of Group)
    A Group is defined as consecutive SS/PBCH blocks
    Bitmap in Group can indicate which SS/PBCH block is actually transmitted within a Group, each Group has the same pattern of SS/PBCH block transmission, and the number of actually transmitted Groups indicates how many consecutive Groups are actually transmitted starting from the first Group
    E.g., [8]+[3] bits in case of 8 Groups and 8 SS/PBCH blocks per Group
    Alt.4: Group-Bitmap+The number of actually transmitted SS/PBCH block in each Group
    A Group is defined as consecutive SS/PBCH blocks
    Group-Bitmap can indicate which Group is actually transmitted, SS/PBCH blocks within a Group are logically consecutive, and the number of actually transmitted SS/PBCH block for each Group indicates how many logically consecutive SS/PBCH blocks are actually transmitted starting from the first index
    Minimum [8]+[3] bits, maximum [8]+[3]*[8] bits in case of 8 Groups and 8 SS/PBCH blocks per Group Alt.5: The number of actually transmitted SS/PBCH blocks+starting index+gap between two consecutive SS/PBCH blocks

[6]+[6]+[6] bits

Alt.6: Group-Bitmap

A Group is defined as consecutive SS/PBCH blocks

Group-Bitmap can indicate which Group is actually transmitted, and all SS/PBCH blocks within a transmitted Group are actually transmitted E.g., [8] bits in case of 8 Groups and 8 SS/PBCH blocks per Group Other alternatives are not precluded Indicated resources are reserved for actually transmitted SS blocks Data channels are rate matched around actually transmitted SS blocks Working Assumption:

For indication in RMSI:

Alt. 1: Group-Bitmap (8 bits)+Bitmap in Group (8 bits)

A Group is defined as consecutive SS/PBCH blocks

Bitmap in Group can indicate which SS/PBCH block is actually transmitted within a Group, where each Group has the same pattern of SS/PBCH block transmission, and Group-Bitmap can indicate which Group is actually transmitted Agreements:

Confirm working assumption of:

UE-specific RRC signaling with full bitmap can be used for indicating the actually transmitted SS blocks for both sub 6 GHz and over 6 GHz cases The actually transmitted SS blocks is indicated in RMSI for both sub 6 GHz and over 6 GHz cases Indication is in compressed form in above 6 GHz case Indicated resources are reserved for actually transmitted SS blocks Data channels are rate matched around actually transmitted SS blocks The number of configured PRACH preambles in each cell was defined to be 64 in LTE (e.g., 3GPP 36.211 section 5.7.2). These PRACH preambles are shared between contention based and non-contention based access.

SUMMARY

According to certain embodiments, a method for use in a wireless device is disclosed. The method comprises determining whether to restrict transmission of a random access preamble during at least a portion of an SS burst set. The SS burst set comprises at least one SS block indicated as being transmitted.

According to certain embodiments, a wireless device comprises memory and processing circuitry. The memory is operable to store instructions. The processing circuitry is operable to execute the instructions. The wireless device is operable to determine whether to restrict transmission of a random access preamble during at least a portion of an SS burst set. The SS burst set comprises at least one SS block indicated as being transmitted.

According to certain embodiments, a computer program product comprises a non-transitory computer readable medium storing computer readable program code. The computer readable program code comprises program code for determining whether to restrict transmission of a random access preamble during at least a portion of an SS burst set. The SS burst set comprises at least one SS block indicated as being transmitted.

The above-described method, wireless device, and/or computer program code may include various other features, including any one or more of the following:

In certain embodiments, the method/wireless device/computer program code further comprises transmitting the random access preamble during a time that transmission of the random access preamble is not restricted.

In certain embodiments, the method/wireless device/computer program code determines to restrict transmission of the random access preamble in any slot that is at least partly overlapping in time with any SS block indicated as being transmitted.

In certain embodiments, determining whether to restrict transmission of the random access preamble is based at least in part on whether full duplex is enabled or disabled.

In certain embodiments, a determination to restrict the random access preamble is made in response to receiving an indication from the network to switch the restriction on.

In certain embodiments, a determination not to restrict the random access preamble is made in response to receiving an indication from the network to switch the restriction off.

In certain embodiments, wherein the indication from the network comprises an on/off flag.

In certain embodiments, the indication to switch the restriction on is based on the network having full duplex disabled. The indication to switch the restriction off is based on the network having full duplex enabled.

In certain embodiments, determining whether to restrict transmission of the random access preamble comprises considering the restriction switched off in response to determining that the wireless device is operating in an FDD system.

In certain embodiments, determining whether to restrict transmission of the random access preamble comprises considering the restriction switched on in response to determining that the wireless device is operating in a TDD system.

In certain embodiments, the wireless device is allowed to transmit the random access preamble only after the SS burst set is completed.

In certain embodiments, the wireless device is allowed to transmit the random access preamble during the SS burst set as soon as the last SS block that is indicated as transmitted has ended.

In certain embodiments, the method/wireless device/computer program code further comprises receiving an indication from a network. The indication indicating which SS blocks of the SS burst set are being transmitted by the network. In some embodiments, the indication of which SS blocks are being transmitted comprises a bitmap received from the network via RRC signaling.

In certain embodiments, method/wireless device/computer program code further comprises receiving a PRACH configuration index and transmitting the random access preamble according to the PRACH configuration index, but avoiding transmission when receiving a transmitted SS block.

In certain embodiments, the random access preamble comprises an NR-RACH preamble.

In certain embodiments, the transmission of the random access preamble is according to a configuration table. In some embodiments, the configuration table does not provide starting positions for the random access preamble. In some embodiments, the table indicates all subframes, slots, or time periods to be used for random access channel allocation.

In certain embodiments, the method/wireless device/computer program code further determines whether to restrict transmission of the random access preamble during potential SS block locations.

According to certain embodiments, a method for use in a network node is disclosed. The method comprises determining whether a wireless device is restricted from transmission of a random access preamble during at least a portion of an SS burst set. The SS burst set comprises at least one SS block indicated as being transmitted.

According to certain embodiments, a network node comprises memory and processing circuitry. The memory is operable to store instructions. The processing circuitry is operable to execute the instructions. The network node is operable to determine whether a wireless device is restricted from transmission of a random access preamble during at least a portion of an SS burst set. The SS burst set comprises at least one SS block indicated as being transmitted.

According to certain embodiments, a computer program product comprises a non-transitory computer readable medium storing computer readable program code. The computer readable program code comprises program code for determining whether a wireless device is restricted from transmission of a random access preamble during at least a portion of an SS burst set. The SS burst set comprises at least one SS block indicated as being transmitted.

The above-described method, network node, and/or computer program code may include various other features, including any one or more of the following:

In certain embodiments, the method/network node/computer program code further comprises monitoring a random access channel for the random access preamble during a time that the wireless device is not restricted from transmission of the random access preamble.

In certain embodiments, the method/network node/computer program code determines that the wireless device is restricted from transmission of the random access preamble in any slot that is at least partly overlapping in time with any SS block indicated as being transmitted.

In certain embodiments, the determination whether the wireless device is restricted from transmission of the random access preamble during at least a portion of the SS burst set is based at least in part on whether full duplex is enabled or disabled.

In certain embodiments, the method/network node/computer program code further comprises sending an indication from the network node to the wireless device, the indication indicating to switch the restriction on.

In certain embodiments, the method/network node/computer program code further comprises sending an indication from the network to the wireless device, the indication indicating to switch the restriction off.

In certain embodiments, the indication comprises an on/off flag.

In certain embodiments, the indication to switch the restriction on is based on the network having full duplex disabled. The indication to switch the restriction off is based on the network having full duplex enabled.

In certain embodiments, the method/network node/computer program code determines that the wireless device is not restricted from transmission of the random access preamble during the SS burst set when the network node is operating in an FDD configuration.

In certain embodiments, the method/network node/computer program code determines that the wireless device is restricted from transmission of the random access preamble during at least a portion of the SS burst set when the network is operating in a TDD configuration.

In certain embodiments, the network node monitors the random access channel for the random access preamble only after the SS burst set is completed in response to determining that the wireless device is allowed to transmit the random access preamble only after the SS burst set is completed.

In certain embodiments, the network node monitors the random access channel for the random access preamble during the SS burst set as soon as the last SS block that is indicated as transmitted has ended in response to determining that the wireless device is allowed to transmit the random access preamble during the SS burst set as soon as the last SS block that is indicated as transmitted has ended.

In certain embodiments, the method/network node/computer program code further comprises sending an indication to the wireless device, the indication indicating which SS blocks of the SS burst set are being transmitted by the network. In some embodiments, the indication of which SS blocks are being transmitted comprises a bitmap sent from the network via RRC signaling.

In certain embodiments, the method/network node/computer program code further comprises sending a PRACH configuration index and monitoring the PRACH according to the PRACH configuration index except for when the wireless device is restricted from transmission of the random access preamble.

In certain embodiments, the random access preamble comprises an NR-RACH preamble.

In certain embodiments, the monitoring of the random access channel for the random access preamble is according to a configuration table. In some embodiments, the configuration table does not provide starting positions for the random access preamble. In some embodiment, the table indicates all subframes, slots, or time periods to be used for random access channel allocation.

In certain embodiments, the method/network node/computer program code further determines whether the wireless device is restricted from transmitting the random access preamble during potential SS block locations.

Certain embodiments of the present disclosure may have one or more technical advantages. Certain embodiments prevent random access preamble transmissions from colliding with SS block transmissions. For example, certain embodiments allow the wireless device to restrict transmission of the random access preamble, even if the PRACH configuration would allow it, based on the location of SS blocks transmitted by the network. As yet another example, certain embodiments allow the wireless device to transmit the random access preamble before the full SS block burst set is transmitted. In this manner, the random access preamble may still be sent even if the SS block burst set is long in duration, e.g., there may be limited locations for transmissions of SS blocks that could guarantee not missing of RACH transmissions from wireless devices. Other advantages may be readily apparent to one having skill in the art. Certain embodiments may have none, some, or all of the above-recited advantages.

BRIEF DESCRIPTION OF THE DRAWINGS

For a more complete understanding of the disclosed embodiments and their features and advantages, reference is now made to the following description, taking in conjunction with the accompanying drawings, in which:

FIG. 12 illustrates an example of a method for use in a network node, in accordance with certain embodiments.

DETAILED DESCRIPTION

Figure 1:
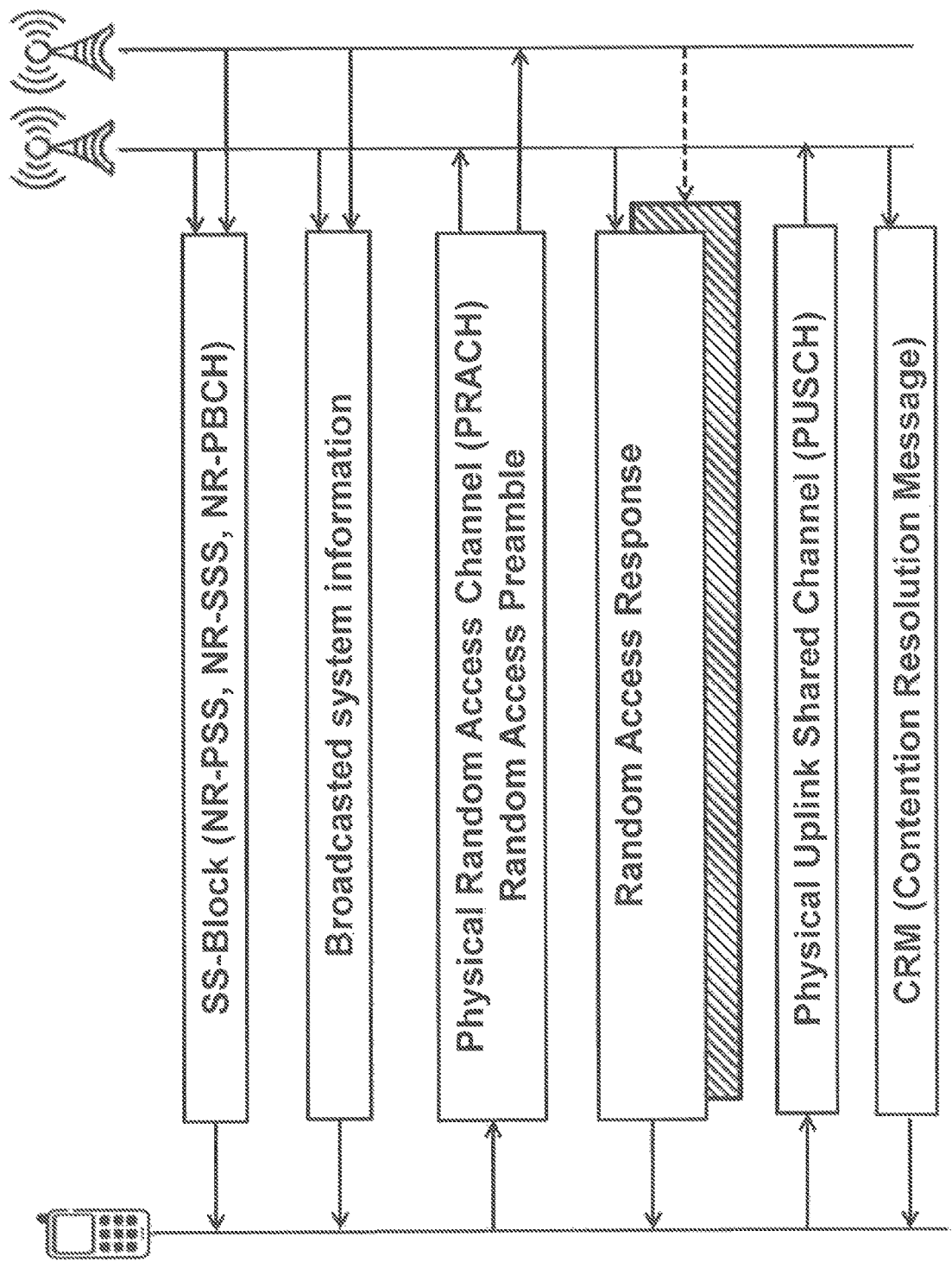
FIG. 1 illustrates an example signaling diagram for random access in a cellular system, in accordance with certain embodiments.
Figure 2:
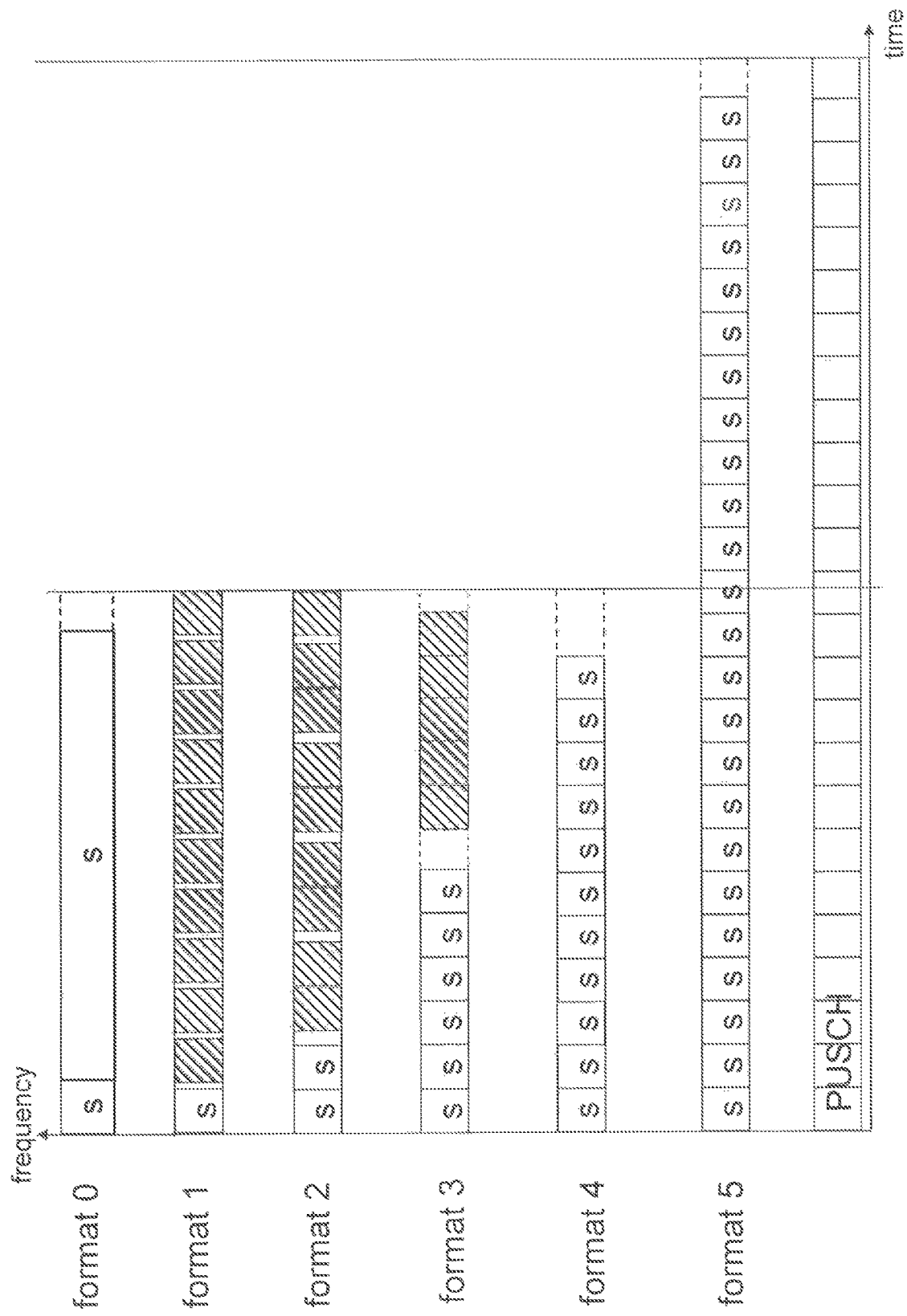
FIG. 2 illustrates example Physical Random Access Channel (PRACH) preamble formats, in accordance with certain embodiments.

In certain embodiments, allocation patterns for NR-RACH can be configured using a table, similar to LTE table 5.7.1-2 in 3GPP TS 36.211. In LTE, there are 64 PRACH configuration indices, rather evenly distributed between the 4 preamble formats (of frame structure type 1), i.e. on average 16 PRACH configurations per preamble format. In NR, 14 preamble formats have been agreed. With 128 PRACH configuration indices, one could have 9-10 configurations per preamble format.

In certain embodiments, the configuration table indicates start positions for NR-RACH allocations. Each start position marks the beginning of a full set of NR-RACH resources needed to provide associations for the set of actually transmitted SS blocks of the last SS burst set (which, in general, will not correspond to exactly one subframe of NR-RACH resources). This is similar to LTE, where some long preamble formats may occupy more than one subframe. Note that the use of frames and subframes (as opposed to slots) ensures that NR-RACH locations in time can be aligned between numerologies, which may simplify TRP NR-RACH reception in the absence of full duplex and/or full digital beamforming. The start positions may be selected in consideration of how SS blocks map to slots of a half-frame. In some embodiments, formats having a long preamble may be dedicated fewer table rows than the shorter formats. An analogous table can be provided for frequencies above 6 GHz, but since some formats may not be allowed, a larger number of table rows can then be dedicated to each of the remaining formats.

Configuring a table for RACH in NR may involve some considerations that are not adequately addressed by the tables used in LTE. For example, to keep the LTE table of manageable size, there may be some limitation in the configurability of which time resources to use. For example, a larger number of resources for RACH may be configured than is needed, which in turn could block other transmissions.

In LTE, this may not be a major issue, since LTE base stations typically support receiving as well as transmitting other types of signals and data simultaneously with listening for (potential) RACH signals. However, in NR systems, TDD may be used, which typically prevents full duplex, e.g., the NR TRP cannot transmit anything at all while listening for potential RACH receptions. Also, NR TRPs may use analog or hybrid beamforming, limiting their ability to receive other signals or data simultaneously with listening for (potential) RACH signals. LTE also supports TDD and provides a table for this case (see e.g., table 5.7.1-2 in 3GPP TS 36.211), but this makes the table quite complicated and inefficient. Also, the issue with limited table flexibility may be more pronounced in NR, since there are 14 different RACH formats agreed for NR as compared to the relatively few formats in LTE (e.g., 5 formats covering TDD and FDD).

Certain embodiments of the present disclosure may provide a solution to these and other problems. As an example, certain embodiments allow the available configurations table to remain comparatively simple, but limit the configurations by restricting that the UE should not be allowed to transmit PRACH preamble when an SS block can possibly be transmitted, or alternatively is indicated as actually being transmitted by the UE.

Certain embodiments of the present disclosure may have one or more technical advantages. As an example, the PRACH resource configuration in time can be made efficiently without preventing SS block transmission from the network (TRP). Note that a full SS block burst set in principle can be quite long duration, so without the solutions proposed in this disclosure, it could be hard to find time locations for transmissions of SS blocks (without risking missing of RACH transmissions from UEs).

The terms RACH, NR-RACH, and PRACH are largely used as synonyms throughout this disclosure. In a more precise usage, PRACH refers specifically to the physical channel, whereas RACH is more general. RACH can refer to both LTE and NR, and the meaning should be clear from the context. Certain embodiments may be applicable to each type of RACH.

As discussed above, certain embodiments allow the available range for RACH configuration (e.g., as compiled in a table) to remain comparatively simple, but complement the range with the restriction that the UE should not be allowed to transmit NR-RACH preamble when an SS block is indicated as actually being transmitted.

In one embodiment, the UE is disallowed from transmitting NR-RACH preambles in any slot that is at least partly overlapping in time with any SS block indicated as actually being transmitted. Hence, even if there is a possible NR-RACH preamble occasion (with duration shorter than a slot) not colliding with an actually transmitted SS block, the possible occasion may be disallowed if any part of the slot it is within/overlaps with an SS block that is indicated as actually being transmitted.

In one embodiment, the disallowing can be adaptively switched on or off, for example, using one flag bit. This can be used by the network to switch the disallowing off if the TRP can handle full duplex.

In one embodiment, the disallowing is considered switched off by the UE (even in absence of such command from the network) if the system is an FDD system. This could be useful as full duplex by TRP is typically supported by FDD systems. In some embodiments, disallowing is considered switched on by the UE if the system is a TDD system. In some embodiments, the disallowing may be determined by the UE without a command from another node in the network. For example, the UE may determine to switch off the disallowing based on determining that the UE is served by a FDD system. In certain embodiments, FDD is used in a paired spectrum and TDD is used in an unpaired spectrum. Accordingly, in certain embodiments, disallowing is considered switched off if the system uses a paired spectrum (which indicates that the system is an FDD system) and disallowing is considered switched on if the system uses an unpaired spectrum (which indicates that the system is a TDD system).

In some alternative embodiments, the UE is only allowed to transmit after the SS burst set is completed, i.e. the UE is not allowed to transmit inside "holes" of the SS burst set (not actually transmitted SS block groups or SS blocks within the SS burst set). In some embodiments, the UE is allowed to transmit after the full set of possible SS blocks (up to length L) has passed, whereas in some embodiments, the UE is allowed to transmit as soon as the last SS block that is indicated as actually transmitted has ended.

According to certain embodiments, a method in a wireless device comprises:
  wireless device receives indication of actually transmitted SS blocks and/or blocks of SS blocks
  wireless device receives PRACH configuration index
  wireless device transmits RACH preamble according to PRACH configuration index (and related standardized table) but avoiding transmission in time instance (or time slot) that is used for actually transmitted SS blocks.

In other embodiments, all the above and below embodiments are modified by replacing "SS block . . . indicated as actually . . . transmitted" with potential SS block locations. For example, the UE may restrict configurations based on whether there is overlap between the preamble and any potential location of an SS block. Potential SS block locations may also be referred to as candidate SS block locations. A potential/candidate SS block may be available as an option for transmitting an SS block, for example, the SS blocks actually transmitted may comprise a subset of the potential/candidate SS blocks. In certain embodiments, the potential/candidate SS blocks correspond to all L locations allowed in recent 3GPP agreements.

In some embodiments, a table of configurations does not provide starting positions for RACH preambles as is specified in LTE. Instead the table lists (or otherwise indicates) all subframes (or alternatively slots, or other time units) that is to be used for RACH allocation.

In some embodiments, a method in a network node/TRP comprises the RAR window being configured by the network to be shorter than the full SS burst set (length L), and some SS block groups inside the SS burst set configured to not be actually transmitted, and at least some of these not actually transmitted SS blocks configured for RACH transmission by selecting such an index in the table.

Note that although a RACH configuration table was mentioned as example in the background and some of the embodiments, the invention is not dependent on the existence of such a table. Certain embodiments could be equally applicable for other systematic or semi-systematic ways of specifying RACH resources in time domain.

Figure 3:
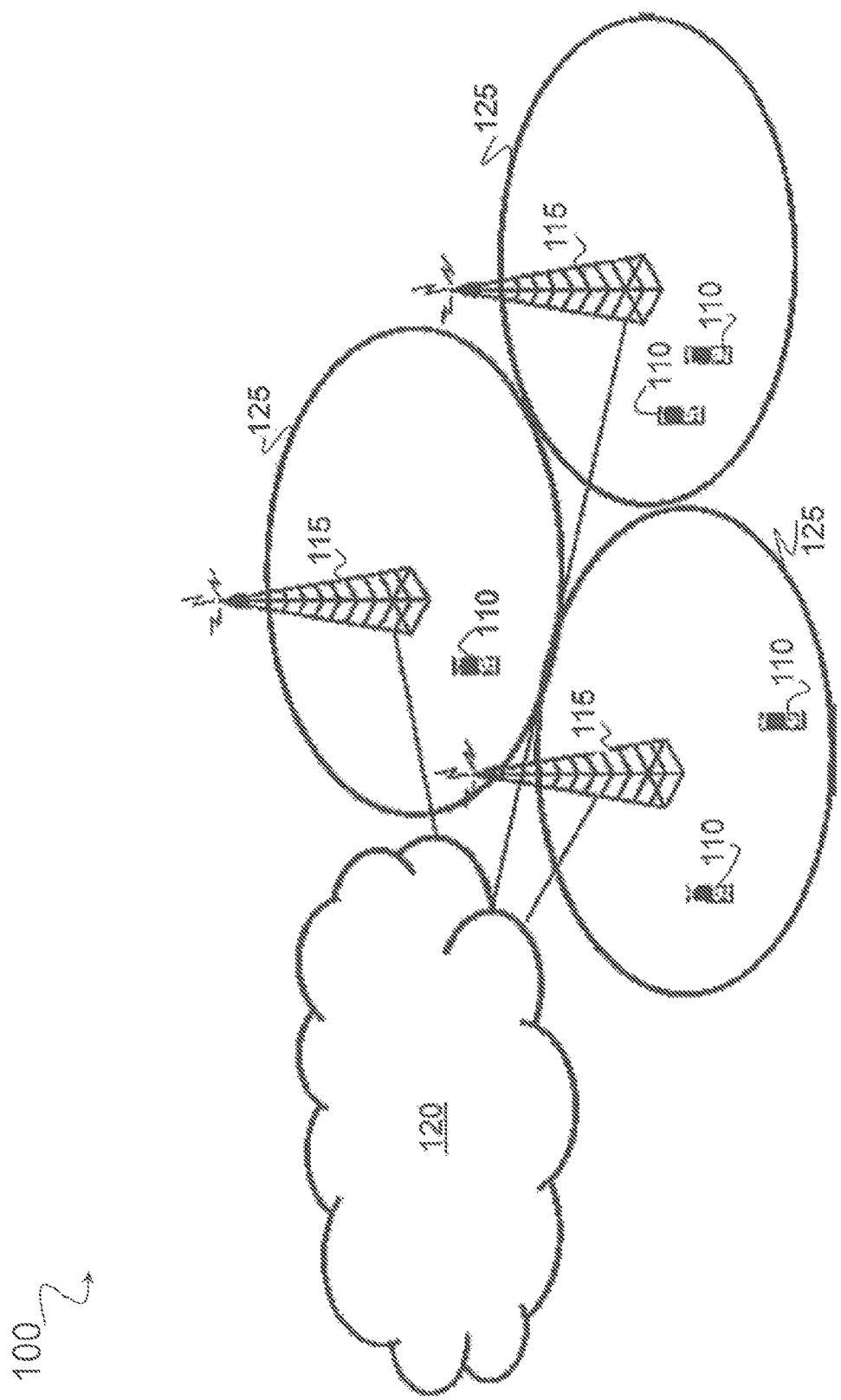
FIG. 3 is a block diagram illustrating an example network, in accordance with certain embodiments.

FIG. 3 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as gNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum (NAS) layer. In non-access stratum signaling, signals between UEs 110 and the core network node may be transparently passed through the radio access network. In certain embodiments, network nodes 115 may interface with one or more network nodes over an internode interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, NB-IoT device, MTC UE or UE capable of machine-to-machine (M2M) communication, low-cost and/or low-complexity UE, a sensor equipped with UE, Tablet, mobile terminals, smart phone, laptop embedded equipment (LEE), laptop mounted equipment (LME), USB dongles, Customer Premises Equipment (CPE), etc.

Also, in some embodiments generic terminology, "radio network node" (or simply "network node") is used. It can be any kind of network node, which may comprise a gNB, base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O & M, OSS, SON, positioning node (e.g., E-SMLC), MDT, or any other suitable network node.

The terminology such as network node and UE should be considered non-limiting and, in particular, does not imply a certain hierarchical relation between the two; in general, "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 4-8.

Although FIG. 3 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an NR or 5G network, the embodiments may be implemented in any appropriate type of telecommunication system supporting any suitable communication and using any suitable components, and are applicable to any radio access technology (RAT) or multi-RAT systems in which a UE receives and/or transmits signals (e.g., data). For example, the various embodiments described herein may be applicable to IoT, NB-IoT, LTE, LTE-Advanced, UMTS, HSPA, GSM, cdma2000, WCDMA, WiMax, UMB, WiFi, another suitable radio access technology, or any suitable combination of one or more radio access technologies.

Figure 4:
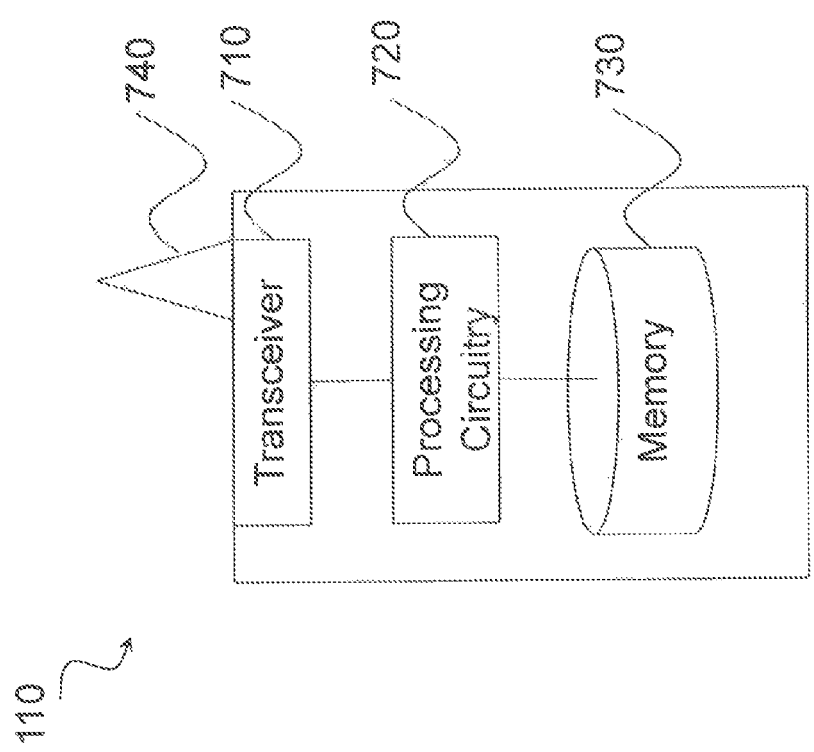
FIG. 4 is a block diagram illustrating an example wireless device, in accordance with certain embodiments.

FIG. 4 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processing circuitry 720, and memory 730. In some embodiments, transceiver 710 facilitates transmitting wireless signals to and receiving wireless signals from network node 115 (e.g., via antenna 740), processing circuitry 720 (e.g., which may include one or more processors) executes instructions to provide some or all of the functionality described above as being provided by wireless device 110, and memory 730 stores the instructions executed by processing circuitry 720.

Processing circuitry 720 may include any suitable combination of hardware and software implemented in one or more modules to execute instructions and manipulate data to perform some or all of the described functions of wireless device 110, such as the functions of UE 110 (i.e., wireless device 110) described herein. For example, in general, processing circuitry may determine whether to restrict transmission of a random access preamble when at least a portion of a synchronization signal (SS) block is indicated as actually being transmitted (or, alternatively, when at least a portion of the SS block can possibly be transmitted). In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 720.

Other embodiments of wireless device 110 may optionally include additional components beyond those shown in FIG. 4 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 720. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 5:
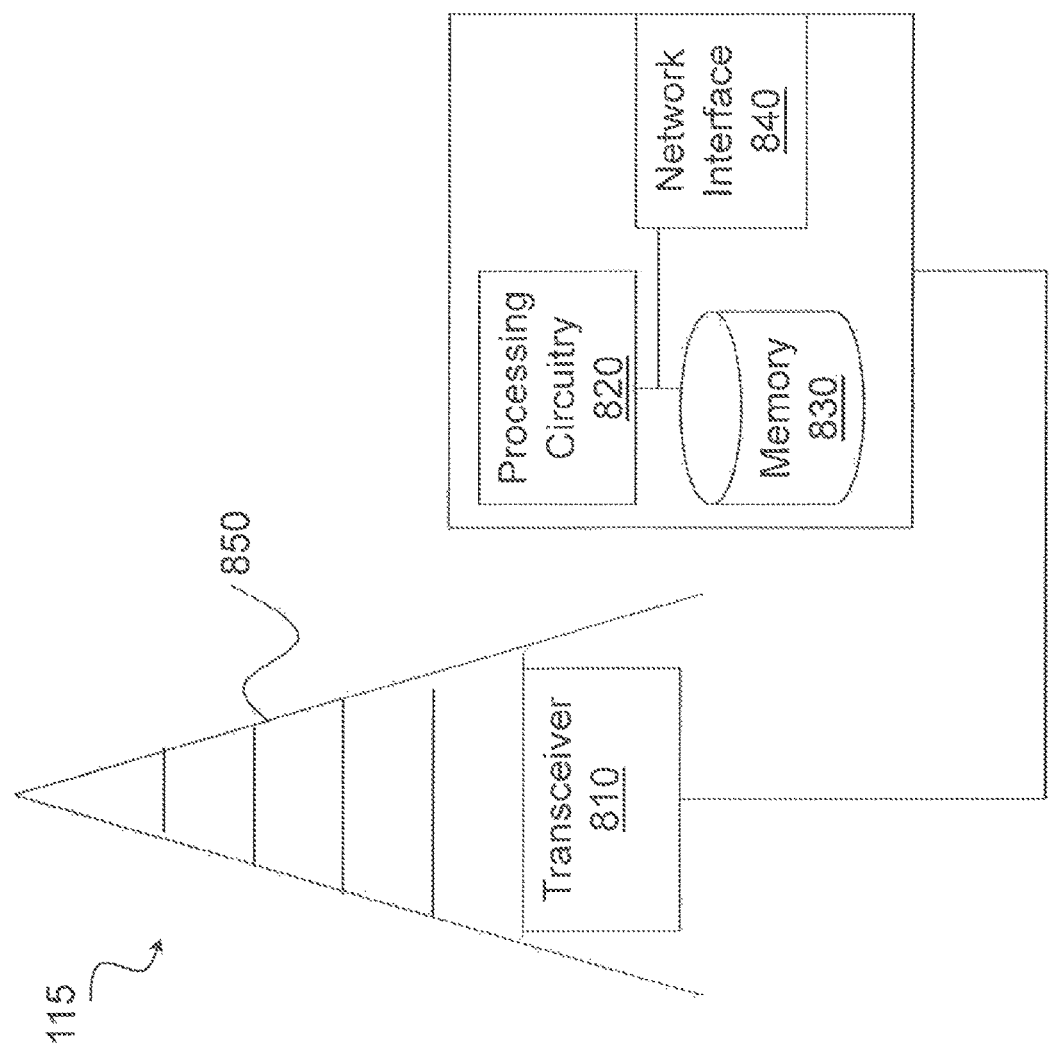
FIG. 5 is a block diagram illustrating an example network node, in accordance with certain embodiments.

FIG. 5 is a block schematic of an exemplary network node 115, in accordance with certain embodiments. Network node 115 may be any type of radio network node or any network node that communicates with a UE and/or with another network node. Examples of network node 115 include an gNB, eNodeB, a node B, a base station, a wireless access point (e.g., a Wi-Fi access point), a low power node, a base transceiver station (BTS), relay, donor node controlling relay, transmission points, transmission nodes, remote radio unit (RRU), remote radio head (RRH), multi-standard radio (MSR) radio node such as MSR BS, nodes in distributed antenna system (DAS), O & M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processing circuitry 820 (e.g., which may include one or more processors), memory 830, and network interface 840. In some embodiments, transceiver 810 facilitates transmitting wireless signals to and receiving wireless signals from wireless device 110 (e.g., via antenna 850), processing circuitry 820 executes instructions to provide some or all of the functionality described above as being provided by a network node 115, memory 830 stores the instructions executed by processing circuitry 820, and network interface 840 communicates signals to backend network components, such as a gateway, switch, router, Internet, Public Switched Telephone Network (PSTN), core network nodes or radio network controllers 130, etc.

Processing circuitry 820 may include any suitable combination of hardware and software implemented in one or more modules to execute instructions and manipulate data to perform some or all of the described functions of network node 115 described herein. For example, in general, processing circuitry 820 may cause network node to indicate to a wireless device whether to restrict transmission of a random access preamble when at least a portion of a synchronization signal (SS) block is indicated as actually being transmitted (or, alternatively, when at least a portion of the SS block can possibly be transmitted). As another example, processing circuitry 820 may determine when to monitor a RACH for random access preambles based on whether the wireless device is restricted from transmitting the random access preamble when at least a portion of a synchronization signal (SS) block is indicated as actually being transmitted (or, alternatively, when at least a portion of the SS block can possibly be transmitted). In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 840 is communicatively coupled to processing circuitry 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 6:
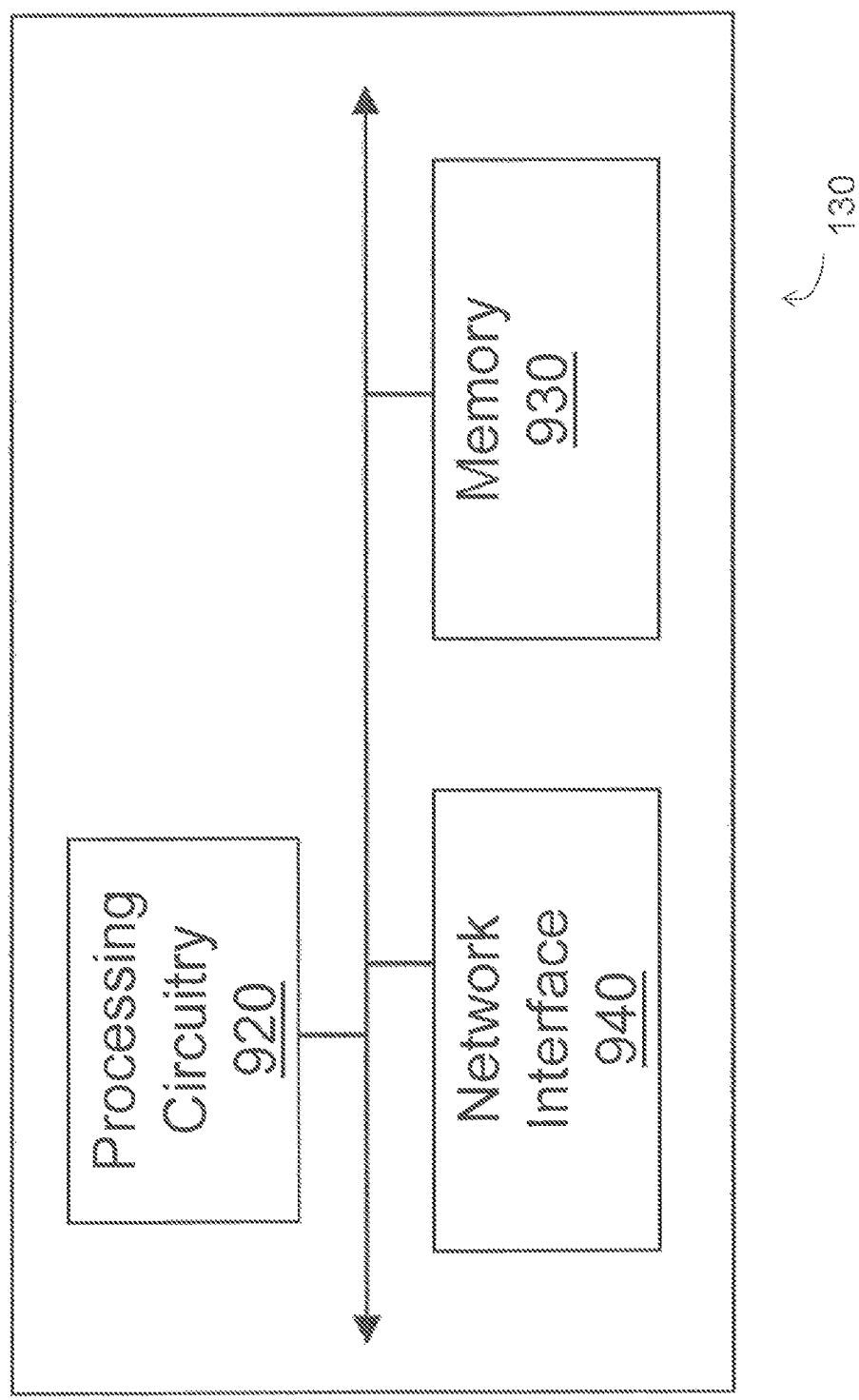
FIG. 6 is a block diagram illustrating an example radio network controller or core network node, in accordance with certain embodiments.

FIG. 6 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 920 (e.g., which may include one or more processors), memory 930, and network interface 940. In some embodiments, processing circuitry 920 executes instructions to provide some or all of the functionality described above as being provided by the network node, memory 930 stores the instructions executed by processing circuitry 920, and network interface 940 communicates signals to any suitable node, such as a gateway, switch, router, Internet, Public Switched Telephone Network (PSTN), network nodes 115, radio network controllers or core network nodes 130, etc.

Processing circuitry 920 may include any suitable combination of hardware and software implemented in one or more modules to execute instructions and manipulate data to perform some or all of the described functions of the radio network controller or core network node 130. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 940 is communicatively coupled to processing circuitry 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

Figure 7:
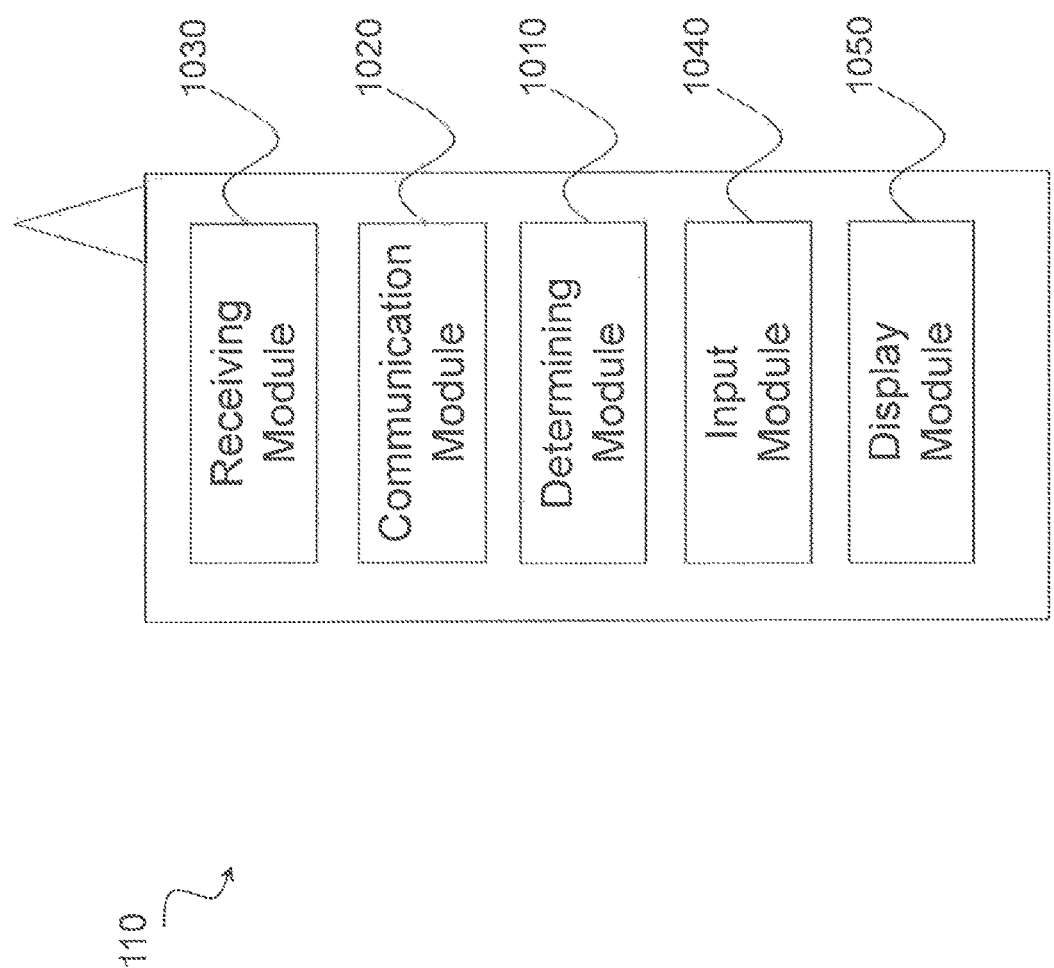
FIG. 7 is a block diagram illustrating an example wireless device including one or more functional modules, in accordance with certain embodiments.

FIG. 7 is a block schematic of an exemplary wireless device 110, in accordance with certain embodiments. Wireless device 110 may include one or more modules. For example, wireless device 110 may include a determining module 1010, a communication module 1020, a receiving module 1030, an input module 1040, a display module 1050, and/or any other suitable modules. Wireless device 110 may perform the methods related to storing or applying system information described herein.

Determining module 1010 may perform the processing functions of wireless device 110. As one example, determining module 1010 may determine whether to restrict transmission of a random access preamble when at least a portion of a synchronization signal (SS) block is indicated as actually being transmitted (or, alternatively, when at least a portion of the SS block can possibly be transmitted). Determining module 1010 may include or be included in one or more processors, such as processing circuitry 720 described above in relation to FIG. 4. Determining module 1010 may include analog and/or digital circuitry configured to perform any of the functions of determining module 1010 and/or processing circuitry 720 described above. The functions of determining module 1010 described above may, in certain embodiments, be performed in one or more distinct modules.

Communication module 1020 may perform the transmission functions of wireless device 110. As one example, communication module 1020 may communicate random access preambles to network node 115. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. As one example, receiving module 1030 may receive SS blocks from network node 115. As another example, receiving module 1030 may receive an indicator from network node 115 indicating whether wireless device 110 is restricted from transmitting a random access preamble when at least a portion of a synchronization signal (SS) block is indicated as actually being transmitted (or, alternatively, when at least a portion of the SS block can possibly be transmitted). Receiving module 1030 may include a receiver and/or a transceiver, such as transceiver 710 described above in relation to FIG. 4. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010. Input module 1040 may be optional in certain embodiments.

Display module 1050 may present signals on a display of wireless device 110. Display module 1050 may include the display and/or any appropriate circuitry and hardware configured to present signals on the display. Display module 1050 may receive signals to present on the display from determining module 1010. Display module 1050 may be optional in certain embodiments.

Determining module 1010, communication module 1020, receiving module 1030, input module 1040, and display module 1050 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

Figure 8:
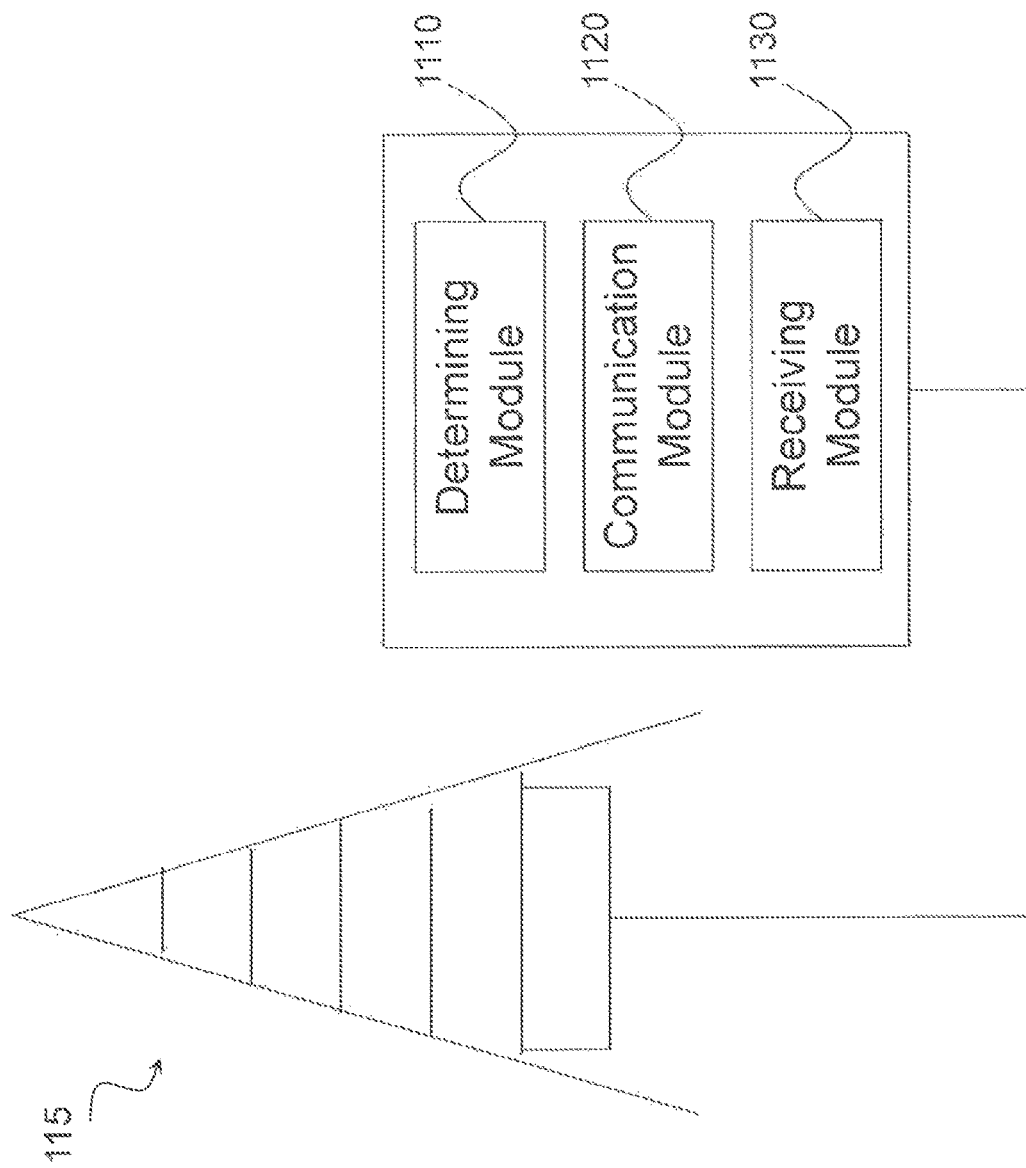
FIG. 8 is a block diagram illustrating an example network node including one or more functional modules, in accordance with certain embodiments.

FIG. 8 is a block schematic of an exemplary network node 115, in accordance with certain embodiments. Network node 115 may include one or more modules. For example, network node 115 may include determining module 1110, communication module 1120, receiving module 1130, and/or any other suitable modules. In some embodiments, one or more of determining module 1110, communication module 1120, receiving module 1130, or any other suitable module may be implemented using one or more processors, such as processing circuitry 820 described above in relation to FIG. 5. In certain embodiments, the functions of two or more of the various modules may be combined into a single module. Network node 115 may perform the methods described as being performed by a network node (such as a gNB).

Determining module 1110 may perform the processing functions of network node 115. As one example, determining module 1110 may determine whether to restrict transmission of a random access preamble when at least a portion of a synchronization signal (SS) block is indicated as actually being transmitted (or, alternatively, when at least a portion of the SS block can possibly be transmitted). Determining module 1110 may further determine information to send to a wireless device (such as an on/off indication as to whether the transmission of the random access preamble is restricted, an index of a table for RACH configuration, and/or an indication of which SS blocks are actually being transmitted by network node 115). As another example, determining module 1110 may determine when to monitor a RACH for random access preambles based on whether the wireless device is restricted from transmitting the random access preamble when at least a portion of a synchronization signal (SS) block is indicated as actually being transmitted (or, alternatively, when at least a portion of the SS block can possibly be transmitted). Determining module 1110 may include or be included in one or more processors, such as processing circuitry 820 described above in relation to FIG. 5. Determining module 1110 may include analog and/or digital circuitry configured to perform any of the functions of determining module 1110 and/or processing circuitry 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. As examples, communication module 1120 may send wireless device 110 SS blocks, indications of which SS blocks are actually being transmitted, indications of whether the transmission of the random access preamble is restricted, and/or an index of a table for RACH configuration. Communication module 1120 may transmit messages to one or more of wireless devices 110. Communication module 1120 may include a transmitter and/or a transceiver, such as transceiver 810 described above in relation to FIG. 5. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. As one example, receiving module 1130 may receive random access preambles from wireless devices 110. Receiving module 1130 may receive any suitable information from a wireless device. Receiving module 1130 may include a receiver and/or a transceiver, such as transceiver 810 described above in relation to FIG. 5. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 8 that may be responsible for providing any suitable functionality, including any of the functionality described above and/or any additional functionality (including any functionality necessary to support the various solutions described herein).

Figure 9:
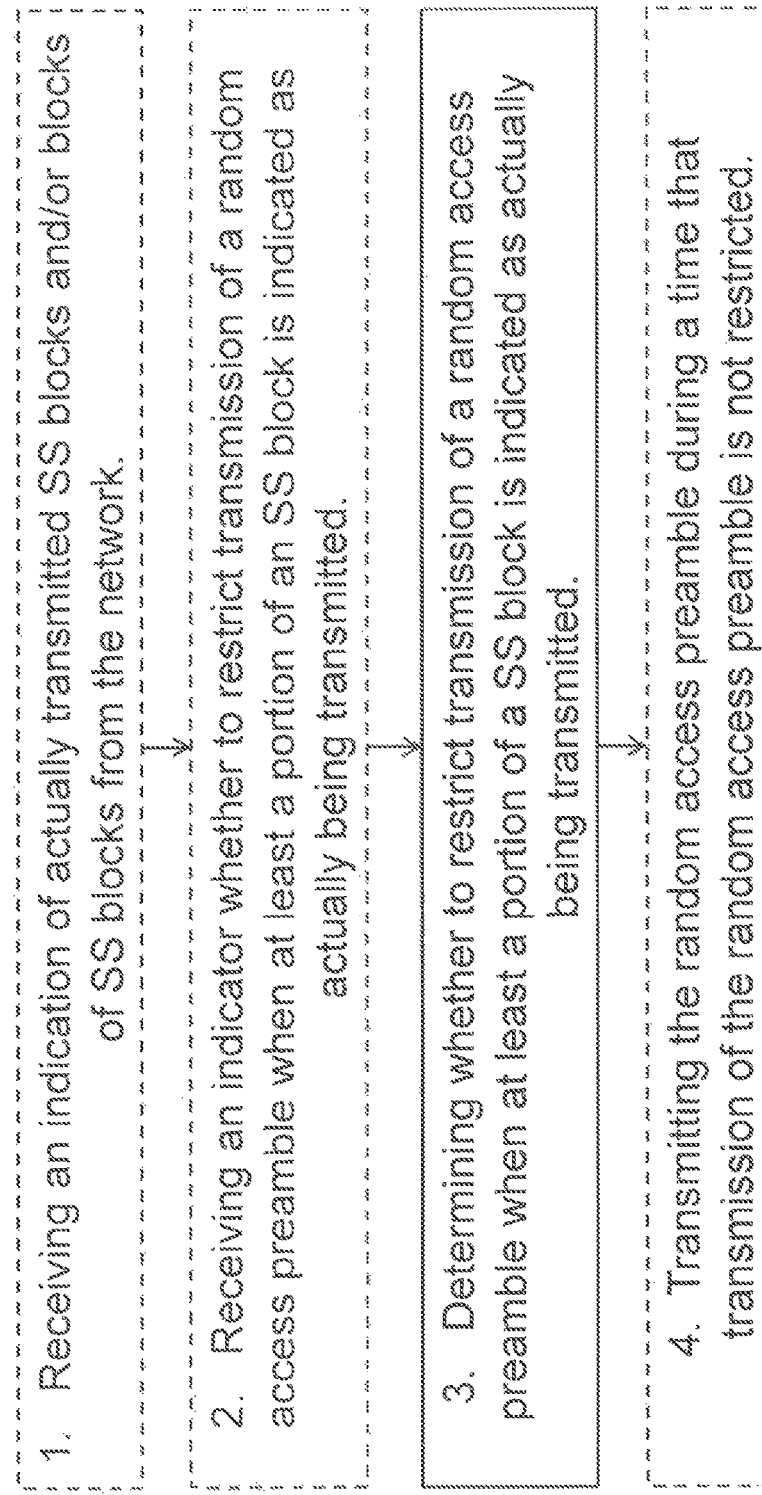
FIG. 9 illustrates an example of a method for use in a wireless device, in accordance with certain embodiments.

FIG. 9 illustrates an example of a method for use in a wireless device 110, in accordance with certain embodiments. In certain embodiments, the method comprises (step 1) receiving an indication of the actually transmitted SS blocks and/or blocks of SS blocks from the network. The method determines (step 3) whether to restrict transmission of a random access preamble when at least a portion of a synchronization signal (SS) block is indicated as actually being transmitted. Certain embodiments may perform the determination based on an indicator optionally received from a network node 115 (step 2). Other embodiments may perform the determination based on applying a rule (such as a rule to turn off the restriction if wireless device 110 is operating in an FDD system). The method further comprises (step 4) transmitting the random access preamble during a time that transmission of the random access preamble is not restricted. As an example, the random access preamble may be transmitted according to a PRACH configuration index received from network node 115, but avoiding transmission in time instance (or time slot) that is used for the actually transmitted SS block (i.e., if it was previously determined in step 3 that the restriction is switched on). As another example, the random access preamble may be transmitted according to a PRACH configuration index received from network node 115, even during a time instance (or time slot) that is used for the actually transmitted SS block (i.e., if it was previously determined in step 3 that the restriction is switched off).

Figure 10:
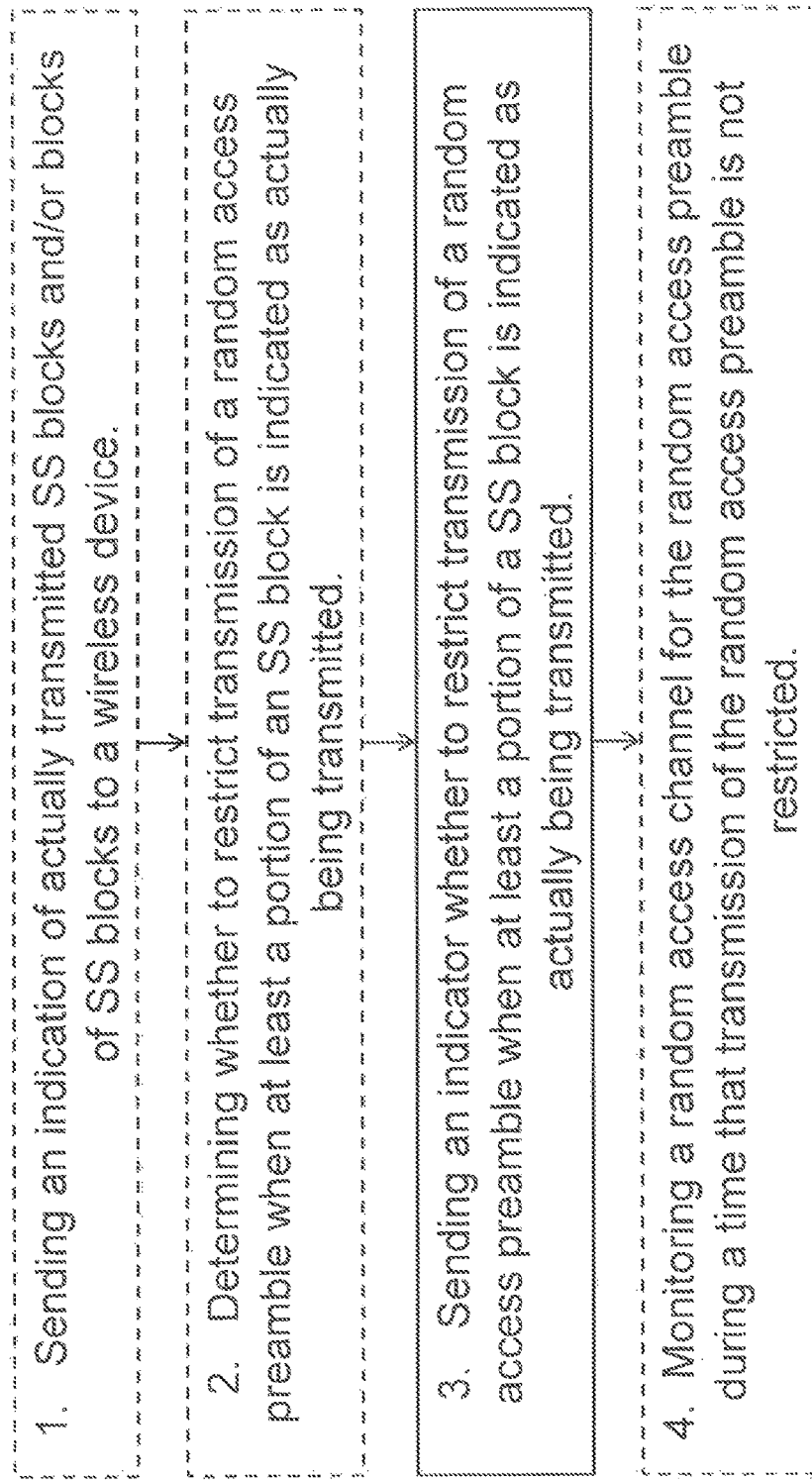
FIG. 10 illustrates an example of a method for use in a network node, in accordance with certain embodiments.

FIG. 10 illustrates an example of a method for use in a network node 115, in accordance with certain embodiments. At step 1, the method comprises sending an indication of actually transmitted SS blocks and/or blocks of SS blocks to wireless device 110. At step 2, the method comprises determining whether to restrict transmission of a random access preamble when at least a portion of an SS block is indicated as actually being transmitted. As examples, the determination may be based on whether full duplex is enabled or disabled, or based on whether network node 115 operates in an FDD system. At step 3, the method comprises sending an indicator to wireless device 110 indicating whether to restrict transmission of a random access preamble when at least a portion of an SS block is indicated as actually being transmitted. In certain embodiments, the indicator may comprise an on/off flag. At step 4, the method comprises monitoring a random access channel for the random access preamble during a time that transmission of the random access preamble is not restricted. As an example, in certain embodiments, the random access preamble may be transmitted according to a PRACH configuration index that network node 115 sends wireless device 110, but avoiding transmission in time instance (or time slot) that is used for the actually transmitted SS block (e.g., if it was previously indicated in step 3 that the restriction is switched on). In some alternative embodiments, network node 115 may perform the monitoring described in step 4 without having to send the indicator in step 3 (e.g., in embodiments where wireless device 110 determines that transmission of the random access preamble is restricted without wireless device 110 having to receive an indicator from the network node 115).

Additional Example Embodiments

Group A

1. A method for use in a wireless device, the method comprising:
    determining whether to restrict transmission of a random access preamble when at least a portion of a synchronization signal (SS) block is indicated as actually being transmitted.
2. The method of example embodiment 1, further comprising: transmitting the random access preamble during a time that transmission of the random access preamble is not restricted.
3. The method of any of example embodiments 1-2, wherein the method determines to restrict transmission of the random access preamble in any slot that is partly overlapping in time with any SS block indicated as actually being transmitted.
4. The method of any of example embodiments 1-3, wherein a determination to restrict the random access preamble is made in response to receiving an indication from the network to switch the restriction on.
5. The method of any of example embodiments 1-4, a determination not to restrict the random access preamble is made in response to receiving an indication from the network to switch the restriction off.
6. The method of any of example embodiments 4-5, wherein the indication from the network comprises an on/off flag.
7. The method of any of example embodiments 4-5, wherein:
    the indication to switch the restriction on is based on the network having full duplex disabled; and
    the indication to switch the restriction off is based on the network having full duplex enabled.
8. The method of any of example embodiments 1-7, wherein determining whether to restrict transmission of the random access preamble comprises switching off the restriction in response to determining that the wireless device is operating in an FDD system.
9. The method of any of example embodiments 1-8, wherein the wireless device is only allowed to transmit the random access preamble after the SS burst set is completed.
10. The method of any of example embodiments 1-8, wherein the wireless device is allowed to transmit the random access preamble after the full set of possible SS blocks (up to length L) has passed.
11. The method of any of example embodiments 1-8, wherein the wireless device is allowed to transmit the random access preamble as soon as the last SS block that is indicated as actually transmitted has ended.
12. The method of any of example embodiments 1-11, further comprising:

receiving an indication of the actually transmitted SS blocks and/or blocks of SS blocks from the network. [E.g., prior to transmitting the random access preamble.]
13. The method of any of example embodiments 1-12, further comprising receiving a PRACH configuration index and transmitting the random access preamble according to the PRACH configuration index, but avoiding transmission in time instance (or time slot) that is used for the actually transmitted SS block.
14. The method of any of example embodiments 1-13, wherein the random access preamble comprises a NR-RACH preamble.
15. The method of any of example embodiments 1-14, wherein the transmission of the random access preamble is according to a configuration table.
16. The method of example embodiment 15, wherein the configuration table does not provide starting positions for the random access preamble.
17. The method of any of example embodiments 1-16, wherein the table indicates all subframes (or alternatively slots, or other time units) to be used for random access channel allocation.
18. The method of any of example embodiments 1-17, modified by replacing "SS block . . . indicated as actually . . . transmitted" with potential SS block locations (all L locations allowed in recent 3GPP agreements).
19. A wireless device comprising memory operable to store instructions and processing circuitry operable to execute the instructions, whereby the wireless device is operable to perform any of the methods of example embodiments 1-18 of Group A.
20. A computer program product comprising a non-transitory computer readable medium storing computer readable program code, the computer readable program code comprises program code for performing any of the methods of example embodiments 1-18 of Group A.

Group B

1. A method for use in a network node, the method comprising:
    sending an indication to a wireless device, the indication indicating whether to restrict transmitting a random access preamble when at least a portion of a synchronization signal (SS) block is indicated as actually being transmitted.
2. The method of example embodiment 1, further comprising: monitoring a random access channel for the random access preamble during a time that transmission of the random access preamble is not restricted.
3. The method of any of example embodiments 1-2, wherein the indication indicates to restrict transmission of the random access preamble in any slot that is partly overlapping in time with any SS block indicated as actually being transmitted.
4. The method of any of example embodiments 1-3, wherein the indication indicates to turn the restriction on.
5. The method of any of example embodiments 1-4, wherein the indication indicates to turn the restriction off.
6. The method of any of example embodiments 4-5, wherein the indication comprises an on/off flag.
7. The method of any of example embodiments 4-5, wherein:
    the indication to switch the restriction on is based on the network having full duplex disabled; and
    the indication to switch the restriction off is based on the network having full duplex enabled.
8. The method of any of example embodiments 1-7, wherein the restriction is turned off when operating in an FDD system.
9. The method of any of example embodiments 1-8, wherein indication indicates that the wireless device is only allowed to transmit the random access preamble after the SS burst set is completed.
10. The method of any of example embodiments 1-8, wherein the indication indicates that the wireless device is allowed to transmit the random access preamble after the full set of possible SS blocks (up to length L) has passed.
11. The method of any of example embodiments 1-8, wherein the indication indicates that the wireless device is allowed to transmit the random access preamble as soon as the last SS block that is indicated as actually transmitted has ended.
12. The method of any of example embodiments 1-11, further comprising:
    sending an indication of the actually transmitted SS blocks and/or blocks of SS blocks from the network.
13. The method of any of example embodiments 1-12, further comprising sending a PRACH configuration index to the wireless device and receiving the random access preamble according to the PRACH configuration index, but not in a time instance (or time slot) that is used for the actually transmitted SS block.
14. The method of any of example embodiments 1-13, wherein the random access preamble comprises a NR-RACH preamble.
15. The method of any of example embodiments 1-14, wherein the transmission of the random access preamble is according to a configuration table.
16. The method of example embodiment 15, wherein the configuration table does not provide starting positions for the random access preamble.
17. The method of any of example embodiments 1-16, wherein the table indicates all subframes (or alternatively slots, or other time units) to be used for random access channel allocation.
18. The method of any example embodiments 1-17, further comprising:
    configuring a random access response (RAR) window to be shorter than the full SS burst set (length L);
    configuring some SS block groups inside the SS burst set to not be actually transmitted; and
    indicating to the wireless device that the wireless device is permitted to transmit the random access preamble on at least some of these not actually transmitted SS blocks. [E.g., indicating the available blocks to the wireless device through selection of an index in a table.]
19. The method of any of example embodiments 1-18, modified by replacing "SS block . . . indicated as actually transmitted" with potential SS block locations (all L locations allowed in recent 3GPP agreements).
20. A network node comprising memory operable to store instructions and processing circuitry operable to execute the instructions, whereby the network node is operable to perform any of the methods of example embodiments 1-19 of Group B.
21. A computer program product comprising a non-transitory computer readable medium storing computer readable program code, the computer readable program code comprises program code for performing any of the methods of example embodiments 1-19 of Group B.

Figure 11:
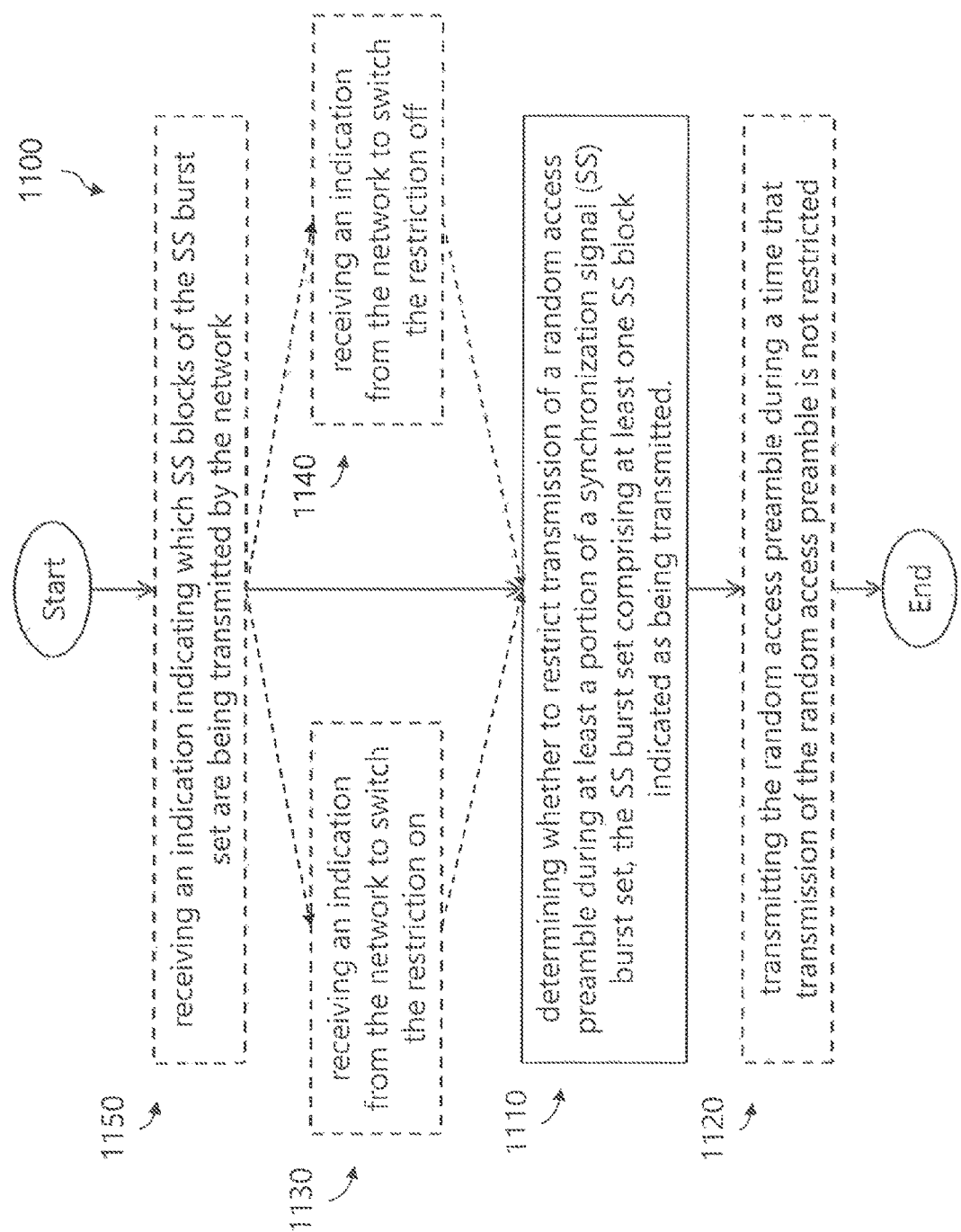
FIG. 11 illustrates an example of a method for use in a wireless device, in accordance with certain embodiments.

FIG. 11 illustrates a further example method 1100 for use in a wireless device, such as wireless device 110. At step 1110, the method determines whether to restrict the transmission of a random access preamble during at least a portion of an SS burst set. The SS burst set includes at least one SS block indicated as being transmitted. For example, the wireless device may determine to restrict transmission of a random access preamble that would overlap with an SS block of the SS burst set. In certain embodiments, the restriction allows the wireless device to transmit the random access preamble only after the SS burst set is completed. In other embodiments, the wireless device is allowed to transmit the random access preamble during the SS burst set as soon as the last SS block that is indicated as transmitted has ended.

In some embodiments, the set of possible times to transmit the preamble is determined based on a random access preamble according to a PRACH configuration index. Accordingly, determining whether to restrict transmission of the random access preamble may be based on restricting one or more of the configured times to transmit based on the PRACH configuration index.

In certain embodiments, determining whether to restrict transmission of the random access preamble is based at least in part on whether full duplex is enabled or disabled. For example, it may not be necessary to restrict the transmission of the random access preamble in an FDD-enabled portion of the network. On the other hand, if FDD is not enabled, it may be necessary to restrict the transmission of the random access preamble during a transmitted SS block in order to prevent the random access preamble and SS block from colliding.

In certain embodiments, determining to restrict the transmission includes considering all potential SS block locations (all L locations allowed in recent 3GPP agreements), not just SS blocks indicated as being actually transmitted. In this manner, wireless device may avoid potential overlap situations, which may be useful, for example, if no indication of which SS blocks are actually transmitted is sent by the network or received by the wireless device. In some embodiments, determining to restrict the transmission of the random access preamble during the SS burst set may be implicit based on determining to restrict transmission of the random access preamble during the potential SS block locations.

Method 1100 may include additional or fewer steps. In certain embodiments, method 1100 further includes optional step 1120, in which the wireless device transmits the random access preamble during a time that transmission of the random access preamble is not restricted. For example, the wires device may abstain from transmitting the random access preamble until the next suitable time, e.g., based on the RACH configuration, during which the transmission is not restricted. In some embodiments, the wireless device may transmit the random access preamble after the SS burst set is complete. In other embodiments, the wireless device may transmit the random access preamble between SS blocks indicated as being transmitted within the SS burst set (i.e., before the SS burst set is complete). Accordingly, the wireless device may transmit the random access preamble to access the network node during a time period in which the network node is able to listen to and receive the random access preamble. Further, the wireless device may rely on a simpler RACH configuration while still avoiding overlapping interference.

In certain embodiments, method 1100 includes one or both of steps 1130 and 1140. In step 1130, the wireless device receives an indication from the network to switch the restriction on. For example, the network may determine that the restriction of the random access preamble is required based on the network elements serving the wireless device, e.g., the network node that could serve the wireless device is TDD. In some embodiments, the indication is received from the potentially serving network node directly. In some embodiments, the indication is received from a different element of the network. In some embodiments, the indication in step 1130 is based on the network having full duplex disabled. At step 1140, the wireless device may receive an indication from the network to switch the restriction off. In a similar manner as step 1130, the indication may be received by a network element, such as a potential serving network node or another element of the network. In some embodiments, the indication in step 1140 is based on the network having full duplex enabled.

In certain embodiments, method 1100 includes both step 1130 and step 1140. For example, wireless device may receive an indication to turn the restriction on in a first instance, but then later, e.g., after wireless device moves to a different location, the wireless device may receive an indication to turn the restriction off due to its new network environment. Step 1130 may come before and/or after step 1140 and vice versa. In some embodiments, method 1100 may include only one of step 1130 and step 1140. In some embodiments, the indication in step 1130 and/or step 1140 includes an on/off flag or a single bit that is set to one or zero.

In certain embodiments, method 1100 further includes step 1150. At step 1150, the method receives an indication indicating which SS blocks of the SS burst set are being transmitted by the network. For example, prior to step 1110, the wireless device may receive an indication that transmission will be made on one or more SS blocks. If the restriction is turned on, the method may then determine whether to restrict the transmission of the random access preamble to not overlap with any of the actually transmitted SS blocks. In certain embodiments, the wireless device may further consider the location of all potential SS blocks (all L locations allowed in recent 3GPP agreements) in determining whether to restrict transmission. In some embodiments, the indication of which SS blocks are being transmitted comprises a bitmap received from the network via RRC signaling. In this manner, the wireless device may avoid transmitting the random access preamble during a time period in which the relevant network node is not monitoring for it.

FIG. 12 illustrates an example method 1200 for use in a network node, such as network node 115, in accordance with certain embodiments. At step 1210, the method determines whether a wireless device is restricted from transmission of a random access preamble during at least a portion of an SS burst set. The SS burst set includes at least one block indicated as being transmitted. In some embodiments, the wireless device is restricted from transmission of the random access preamble in any slot that is at least partly overlapping in time with any SS block indicated as being transmitted. In some embodiments, the determination whether the wireless device is restricted from transmission of the random access preamble during at least a portion of the SS burst set is based at least in part on whether full duplex is enabled or disabled. For example, no restriction may be made if full duplex is enabled, but some restriction of transmission of the random access preamble may be made if full duplex is disabled.

In certain embodiments, the network node sends an indication to the wireless device indicating which SS blocks of the SS burst set are being transmitted by the network. The wireless device may base the restriction on when the SS blocks are indicated as being transmitted. In some embodiments, the indication of which SS blocks are being transmitted comprises a bitmap sent from the network via radio resource control (RRC) signaling.

Method 1200 may include additional or fewer steps. In certain embodiments, method 1200 may further include step 1220, in which a random access channel is monitored for the random access preamble during a time that the wireless device is not restricted from transmission of the random access preamble. For example, the network node may be configured such that it cannot monitor the random access channel at all times, e.g., because network node is configured to be TDD or configured with particular beam forming methods. The network node may then only monitor the random access channel during specific times, such as when it expects the wireless device to transmit the random access preamble, e.g., based on a known preamble configuration of the wireless device. In this manner, the network node may monitor the random access channel when wireless device potentially may transmit the random access preamble.

In certain embodiments, in response to determining that the wireless device is allowed to transmit the random access preamble only after the SS burst set is completed, the network node monitors the random access channel for the random access preamble only after the SS burst set is completed. In certain embodiments, in response to determining that the wireless device is allowed to transmit the random access preamble during the SS burst set as soon as the last SS block that is indicated as transmitted has ended, the network node monitors the random access channel for the random access preamble during the SS burst set as soon as the last SS block that is indicated as transmitted has ended. In this manner, step 1220 may be adjusted based on the restriction criteria of the wireless device, such that the network node may monitor the random access channel for the random access preamble when it is possible for the wireless device to transmit the random access preamble.

In certain embodiments, method 1200 includes one or both of steps 1230 and 1240. In step 1230, an indication to switch the restriction on is sent from the network. For example, the network may determine that the restriction of the random access preamble is required based on the network elements serving the wireless device, e.g., the network node that could serve the wireless device is TDD. In some embodiments, the network node sends the indication, or alternatively, the indication is sent from a different element of the network. At step 1240, the network sends an indication to switch the restriction off. In a similar manner as step 1230, the indication may be sent by the network node or another element of the network. In certain embodiments, method 1200 includes both step 1230 and step 1240. For example, the configuration of the network node may change, e.g., from TDD to FDD or to a different beamforming configuration, that changes the times at which the network node may monitor for random access preambles from the wireless device. Step 1230 may come before and/or after step 1240 and vice versa. In some embodiments, method 1200 may include only one of step 1230 and step 1240.

In certain embodiments, method 1200 includes step 1250, in which a physical random access channel (PRACH) configuration index is sent and the PRACH is monitored according to the PRACH configuration index except for when the wireless device is restricted from transmission of the random access preamble. For example, the wireless device may only transmit during certain times based on the PRACH configuration indicated by the PRACH configuration index. In turn, the network node may only monitor for random access preambles from wireless device based on the known configuration, although it may abstain from monitoring if the wireless device restricts the transmission, e.g., to avoid overlap with SS blocks.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device operating in an unpaired spectrum, the method comprising:
   receiving, from a network, a configuration corresponding to a Physical Random Access Channel (PRACH);
   receiving, from the network via Radio Resource Control (RRC) signaling, a bitmap that provides an indication of time locations corresponding to synchronization signal (SS) blocks of an SS burst set transmitted by the network;
   restricting at least one PRACH transmission during at least one of the time locations;
   determining, based on the configuration and the bitmap, a time slot between the time locations that does not overlap with the time locations; and
   performing a PRACH transmission during the time slot.

2. The method of claim 1, wherein the PRACH transmission comprises a random access channel preamble.

3. The method of claim 1, wherein the configuration comprises a configuration table that indicates slots corresponding to random access channel allocation.

4. The method of claim 1, wherein the configuration comprises a configuration table that indicates start positions corresponding to random access channel allocation.

5. The method of claim 1, wherein the bitmap indicates a plurality of groups of SS blocks, each group comprising a plurality of consecutive SS blocks.

6. The method of claim 5, wherein the bitmap further indicates which SS blocks in each group are transmitted.

7. A non-transitory computer readable medium having stored thereon computer readable program code executable to cause a wireless device to perform operations comprising:
   receiving, from a network, a configuration corresponding to a Physical Random Access Channel (PRACH);
   receiving, from the network via Radio Resource Control (RRC) signaling, a bitmap that provides an indication of time locations corresponding to synchronization signal (SS) blocks of an SS burst set transmitted by the network;

restricting at least one PRACH transmission during the time locations;

determining, based on the configuration and the bitmap, a time slot between the time locations that does not overlap with the time locations; and performing a PRACH transmission during the time slot.

8. The non-transitory computer readable medium of claim 7, wherein the PRACH transmission comprises a random access channel preamble.

9. The non-transitory computer readable medium of claim 7, wherein the configuration comprises a configuration table that indicates slots corresponding to random access channel allocation.

10. The non-transitory computer readable medium of claim 7, wherein the configuration comprises a configuration table that indicates start positions corresponding to random access channel allocation.

11. The non-transitory computer readable medium of claim 7, wherein the bitmap indicates a plurality of groups of SS blocks, each group comprising a plurality of consecutive SS blocks.

12. The non-transitory computer readable medium of claim 11, wherein the bitmap further indicates which SS blocks in each group are transmitted.

13. A system comprising:

a non-transitory memory; and processing circuitry coupled to the non-transitory memory and configured to read instructions from the non-transitory memory to cause the system to perform operations comprising:

receiving, from a network, a configuration corresponding to a Physical Random Access Channel (PRACH);

receiving, from the network via Radio Resource Control (RRC) signaling, a bitmap that provides an indication of time locations corresponding to synchronization signal (SS) blocks of an SS burst set transmitted by the network;

restricting at least one PRACH transmission during the time locations;

determining, based on the configuration and the bitmap, a time slot between the time locations that does not overlap with the time locations; and performing a PRACH transmission during the time slot.

14. The system of claim 13, wherein the PRACH transmission comprises a random access channel preamble.

15. The system of claim 13, wherein the configuration comprises a configuration table that indicates slots corresponding to random access channel allocation.

16. The system of claim 13, wherein the configuration comprises a configuration table that indicates start positions corresponding to random access channel allocation.

17. The system of claim 13, wherein the bitmap indicates a plurality of groups of SS blocks, each group comprising a plurality of consecutive SS blocks, and wherein the bitmap further indicates which SS blocks in each group are transmitted.

* * * * *